(12) United States Patent
Chintakindi et al.

(10) Patent No.: US 9,915,543 B2
(45) Date of Patent: Mar. 13, 2018

(54) DATA PROCESSING SYSTEM COMMUNICATING WITH A MAP DATA PROCESSING SYSTEM TO DETERMINE OR ALTER A NAVIGATION PATH BASED ON ONE OR MORE ROAD SEGMENTS

(71) Applicant: Allstate Insurance Company, Northbrook, IL (US)

(72) Inventors: Sunil Chintakindi, Naperville, IL (US); Howard Hayes, Glencoe, IL (US); Santhosh Thammi, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/182,955

(22) Filed: Jun. 15, 2016

(65) Prior Publication Data

US 2017/0191847 A1    Jul. 6, 2017

Related U.S. Application Data

(60) Provisional application No. 62/274,835, filed on Jan. 5, 2016, provisional application No. 62/274,888, filed on Jan. 5, 2016.

(51) Int. Cl.
*G01C 21/34*  (2006.01)
*G06Q 40/08*  (2012.01)
(Continued)

(52) U.S. Cl.
CPC ..... *G01C 21/3492* (2013.01); *G01C 21/3484* (2013.01); *G01C 21/3667* (2013.01);
(Continued)

(58) Field of Classification Search
CPC ............ G01C 21/3667; G01C 21/3484; G01C 21/3492; G01C 21/3461; G01C 21/3469;
(Continued)

(56) References Cited

U.S. PATENT DOCUMENTS 8,332,242 B1 * 12/2012 Medina, III ........... G06Q 40/08
                                                                 705/35
9,581,461 B1 *  2/2017 Chintakindi ......... G01C 21/367
(Continued)

OTHER PUBLICATIONS

Aug. 30, 2016—U.S. Non-Final Office Action—U.S. Appl. No. 15/182,920.

(Continued)

*Primary Examiner* — Abby Lin
(74) *Attorney, Agent, or Firm* — Banner & Witcoff, Ltd.

(57) ABSTRACT

Systems and methods are disclosed for generating a display of one or more multi-dimensional navigation scores. The data source device may comprise a data source computer and a database storing historical data or real time data associated with a plurality of segments of road. A map data processing device may have a map data processing computer and memory storing computer-executable instructions. The map data processing device may determine a geographical location based on a location determining device, determine a segment of road associated with the geographical location, and/or receive, from the data source device, one or more of the historical data or real time data for the segment of road. The map data processing device may determine a threshold navigation score for the segment of road, determine, using the one or more of the historical data or real time data, a multi-dimensional navigation score for the segment of road, and/or determine whether the multi-dimensional navigation score for the segment of road exceeds the threshold navigation score. Based on the determination of whether the multi-dimensional navigation score for the segment of road exceeds the threshold navigation score, the map data processing device may generate a display of the multi-dimensional navigation score.

17 Claims, 11 Drawing Sheets

(51) Int. Cl.
    *H04W 4/04*         (2009.01)
    *G06F 17/30*       (2006.01)
    *G01C 21/36*      (2006.01)

(52) U.S. Cl.
    CPC ....... *G06F 17/30241* (2013.01); *G06Q 40/08* (2013.01); *H04W 4/046* (2013.01)

(58) Field of Classification Search
    CPC ............ G01C 21/3415; G01C 21/3453; G06F 17/30241; G06Q 40/08; H04W 4/046
    See application file for complete search history.

(56) References Cited

U.S. PATENT DOCUMENTS

| | | | |
|---|---|---|---|
| 2002/0016667 A1* | 2/2002 | Baur ................. | G01C 21/3415 701/117 |
| 2003/0060977 A1* | 3/2003 | Jijina ................ | G01C 21/3415 701/414 |
| 2009/0271325 A1* | 10/2009 | Wilson .................. | G06Q 40/06 705/36 R |
| 2013/0226441 A1* | 8/2013 | Horita ..................... | B60Q 9/00 701/118 |
| 2014/0062725 A1 | 3/2014 | Maston | |
| 2016/0171621 A1 | 6/2016 | Bogovich et al. | |

OTHER PUBLICATIONS

Oct. 26, 2016—U.S. Notice of Allowance—U.S. Appl. No. 15/182,920.
Feb. 2, 2017 (PCT) Notification of Transmittal of the International Search Report and the Written Opinion—App PCT/US17/12016.

* cited by examiner

DATA PROCESSING SYSTEM COMMUNICATING WITH A MAP DATA PROCESSING SYSTEM TO DETERMINE OR ALTER A NAVIGATION PATH BASED ON ONE OR MORE ROAD SEGMENTS

CROSS-REFERENCE TO RELATED APPLICATIONS

This application claims priority to U.S. Provisional Patent Application Ser. No. 62/274,835, filed Jan. 5, 2016 and entitled "Multi-Dimensional Risk Scoring Model," and to U.S. Provisional Patent Application Ser. No. 62/274,888, filed Jan. 5, 2016 and entitled "Live Risk Map." This application is related to U.S. patent application Ser. No. 15/182,920 entitled "Data Processing System Communicating With A Map Data Processing System To Generate A Display Of One Or More Segments Of One Or More Vehicle Routes" and filed Jun. 15, 2016. Each of the aforementioned applications is herein incorporated by reference in its entirety.

TECHNICAL FIELD

Aspects of the disclosure generally relate to computing systems generating multi-dimensional risk scores by accessing real time data and/or historical data from various data sources. A data processing system may communicate with a map data processing system to determine or alter a navigation path based on one or more road segments.

BACKGROUND

Mapping services that determine traffic conditions and driving routes are known. However, knowledge of these traffic conditions and driving routes is insufficient for some use cases.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices configured to generate a display of one or more multi-dimensional navigation scores. The data source device may comprise a data source computer and a database storing historical data or real time data associated with a plurality of segments of road. The system may comprise a map data processing device comprising a map data processing computer and memory storing computer-executable instructions that, when executed by the map data processing computer, cause the map data processing device to determine a geographical location based on a location determining device. The map data processing device may determine a segment of road associated with the geographical location and receive, from the data source device, one or more of the historical data or real time data for the segment of road. The map data processing device may determine a threshold navigation score for the segment of road. The map data processing device may determine, using the one or more of the historical data or real time data, a multi-dimensional navigation score for the segment of road and determine whether the multi-dimensional navigation score for the segment of road exceeds the threshold navigation score. Based on the determination of whether the multi-dimensional navigation score for the segment of road exceeds the threshold navigation score, the map data processing device may generate a display of the multi-dimensional navigation score.

In some aspects, the memory may store computer-executable instructions that, when executed by the map data processing computer, cause the map data processing device to determine a second segment of road associated with the geographical location and receive, from the data source device, one or more of the historical data or real time data for the second segment of road. The map data processing device may determine, using the one or more of the historical data or real time data for the second segment of road, a second multi-dimensional navigation score the second segment of road. In response to determining that the second multi-dimensional navigation score does not exceed the threshold navigation score, the map data processing device may prevent display of the second multi-dimensional navigation score. The segment of road and the second segment of road may form at least a portion of a navigation route for a vehicle.

In some aspects, in response to a determination that the multi-dimensional navigation score for the segment of road exceeds the threshold navigation score, the map data processing device may generate a display of a recommendation to deploy a fleet or to drive at a time in the future. The map data processing device may determine that a second multi-dimensional navigation score for a second segment of road associated with the geographical location exceeds the threshold navigation score. In response to a determination that the multi-dimensional navigation score for the segment of road exceeds the threshold navigation score and that the second multi-dimensional navigation score for the second segment of road exceeds the threshold navigation score, the map data processing device may generate a display of a recommendation to deploy a fleet or to drive at a time in the future.

In some aspects, the map data processing device may re-determine the multi-dimensional navigation score for the segment of road in response to a determination that a threshold time has been exceeded. The map data processing device may generate a display of the re-determined multi-dimensional navigation score. In some aspects, determining the multi-dimensional navigation score may comprise determining the multi-dimensional navigation score based on two or more of data indicating peer traffic, data indicating driver behavior, data indicating passenger behavior, weather data, data indicating roadway features, adverse event probability data, risk cost index data, or data describing a vehicle.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
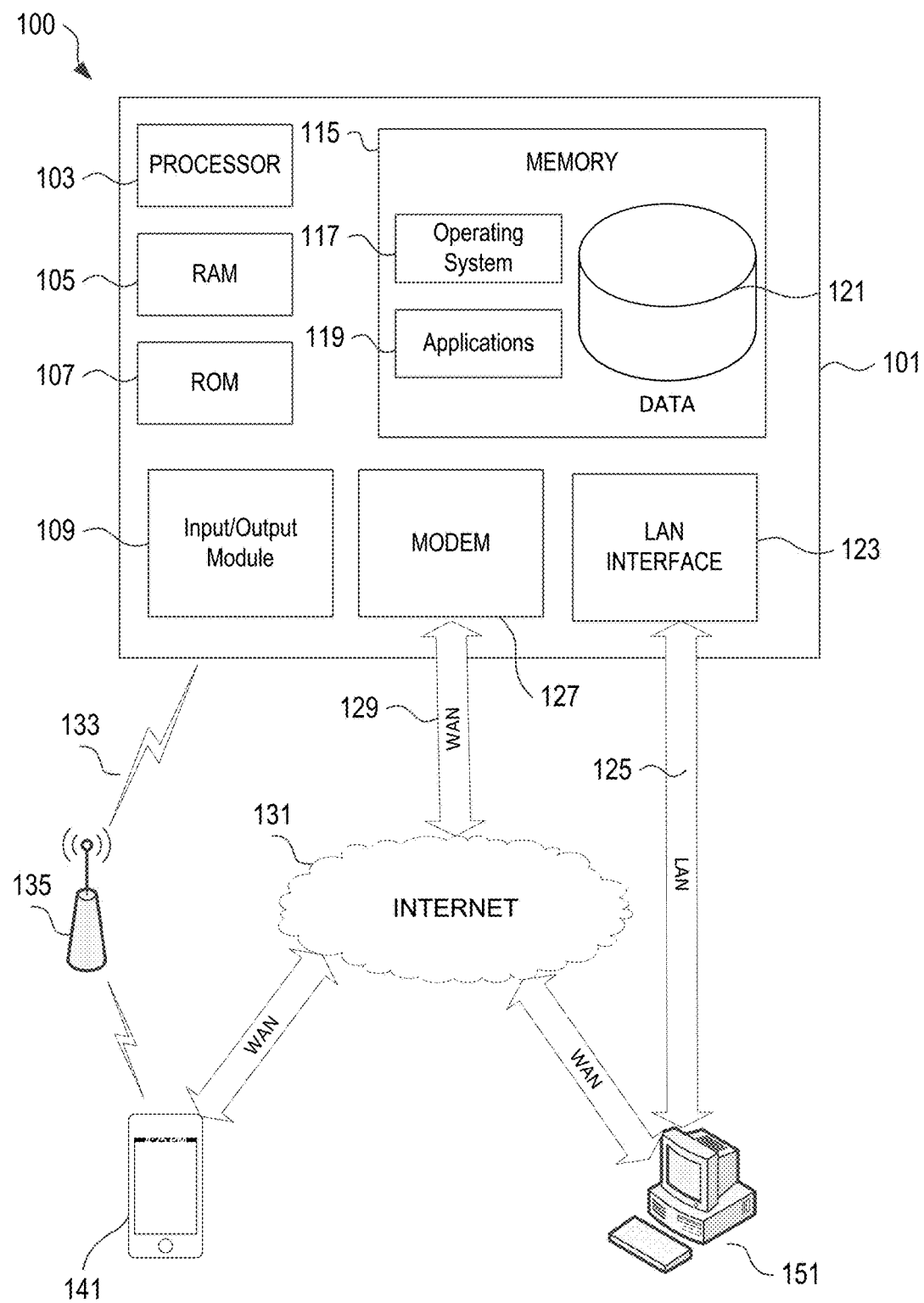
FIG. 1 illustrates a network environment and computing systems that may be used to implement aspects of the disclosure.

FIG. 1 illustrates a block diagram of a computing device 101 in a multi-dimensional risk score generation system 100 that may be used according to one or more illustrative embodiments of the disclosure. The computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as multi-dimensional risk score generation computing devices or systems, configured as described herein for receiving data from various sources and generating one or more multi-dimensional risk scores.

Input/Output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the computing device 101 to execute a series of computer-readable instructions to receive data from various sources and generate one or more multi-dimensional risk scores.

The computing device 101 may operate in a networked environment 100 supporting connections to one or more remote computers, such as terminals/devices 141 and 151. Multi-dimensional risk score generation computing device 101, and related terminals/devices 141 and 151, may include devices installed in vehicles, mobile devices that may travel within vehicles, or devices outside of vehicles that are configured to receive and process vehicle and other sensor data. Thus, the computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 119 used by the computing device 101 may include computer executable instructions (e.g., multi-dimensional risk score generation, and the like) for receiving data and performing other related functions as described herein.

Figure 2:
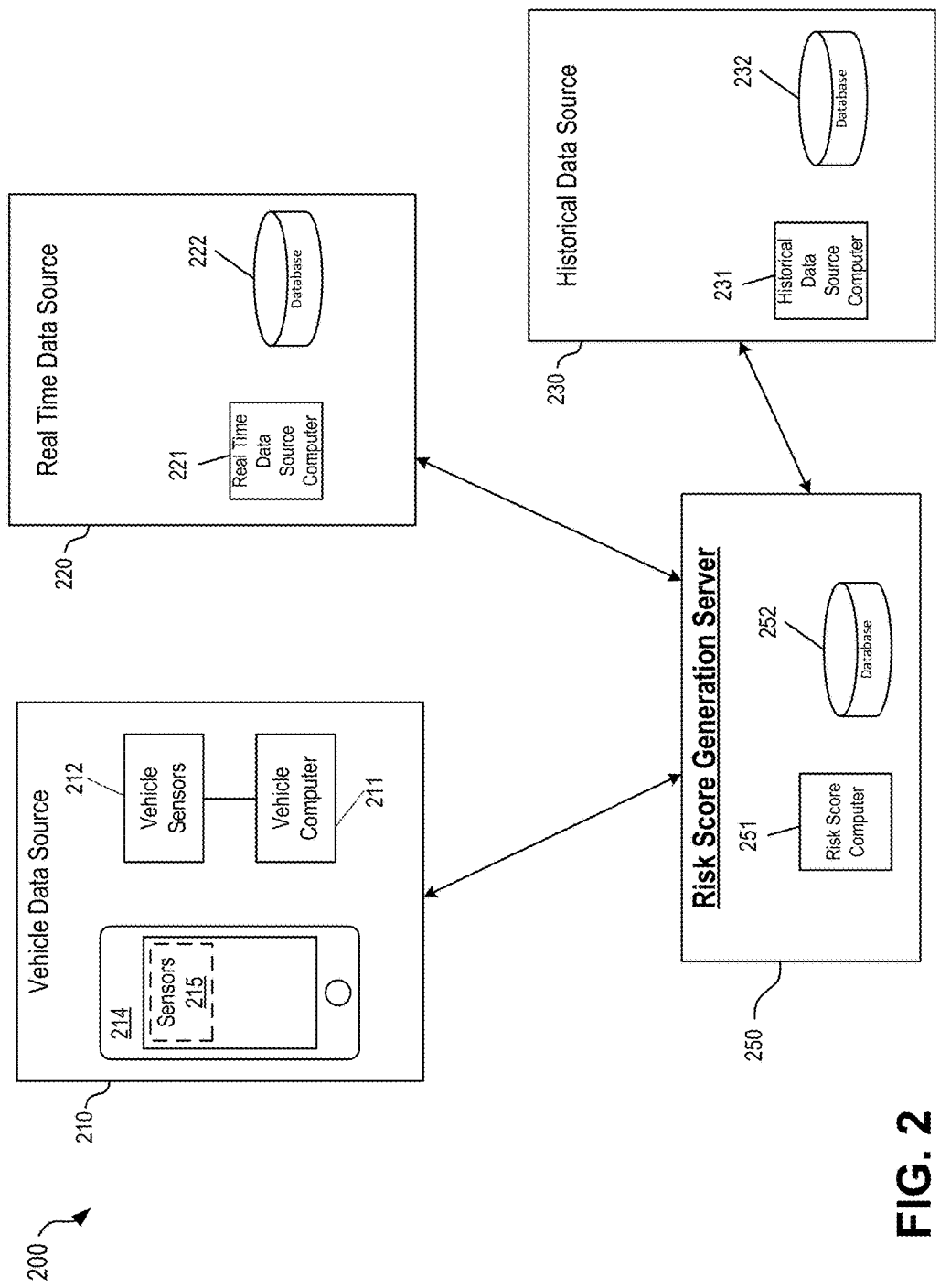
FIG. 2 is a diagram illustrating various example components of a risk score generation system according to one or more aspects of the disclosure.

FIG. 2 is a diagram illustrating various example components of a multi-dimensional risk score generation system 200 according to one or more aspects of the disclosure. The multi-dimensional risk score generation system 200 may include a vehicle data source 210, a mobile computing device 214, other vehicle data sources (not illustrated), a real time data source 220, a historical data source 230, a map data processing server (e.g., a multi-dimensional risk score generation server) 250, and additional related components. Each component shown in FIG. 2 may be implemented in hardware, software, or a combination of the two. Additionally, each component of the multi-dimensional risk score generation system 200 may include a computing device (or system) having some or all of the structural components described above for computing device 101.

The system 200 may include a vehicle data source 210, containing some or all of the hardware/software components as the computing device 101 depicted in FIG. 1. The vehicle data source 210 may comprise a vehicle having a vehicle computer 211 and vehicle sensors 212. While one vehicle is illustrated, vehicle data may be collected from a plurality of vehicles. The vehicle sensors 212 may sense driving data, such speed, acceleration, rotation, braking, etc. The vehicle sensors 212 may include a location determining device, such as a Global Positioning System (GPS) device, a cellular device, etc., for determining a geographical location of the vehicle 210. The vehicle computer 211 may collect the driving data from the vehicle sensors 212 and send the data to the multi-dimensional risk score generation server 250 for processing, as will be described in further detail below.

The system 200 may include a mobile computing device 214, containing some or all of the hardware/software components as the computing device 101 depicted in FIG. 1. The mobile computing device 214 (e.g., a mobile phone, a tablet, a wearable, etc.) may be located inside of a vehicle and thus be configured to sense and monitor driving data. For example, the sensors 215 of the mobile computing device 214 may sense driving data, such speed, acceleration, rotation, braking, etc. The sensors 215 may include a location determining device, such as a Global Positioning System (GPS) device, a cellular device, etc., for determining a geographical location of the mobile computing device 214. If the mobile computing device 214 is inside of the vehicle 210, the location determining device of the mobile computing device 214 may be used to determine a geographical location of the vehicle 210. The mobile computing device 214 may collect the driving data from the sensors 215 and send the data to the multi-dimensional risk score generation server 250 for processing, as will be described in further detail below.

The system 200 may include a real time data source 220, containing some or all of the hardware/software components as the computing device 101 depicted in FIG. 1. Real time data source 220 may comprise a real time data source computer 221 for receiving and/or processing real time data, as will be described in further detail below. The real time data source 220 may also comprise a database 222 used to store the real time data collected by the real time data source computer 221. The real time data source computer 221 may transmit the real time data to the multi-dimensional risk score generation server 250 for processing, as will be described in further detail below.

The system 200 may include a historical data source 230, containing some or all of the hardware/software components as the computing device 101 depicted in FIG. 1. Historical data source 230 may comprise a historical data source computer 231 for receiving and/or processing historical data, as will be described in further detail below. The historical data source 230 may also comprise a database 232 used to store the historical data collected by the historical data source computer 231. The historical data source computer 231 may transmit the historical data to the multi-dimensional risk score generation server 250 for processing, as will be described in further detail below.

The system 200 may include a multi-dimensional risk score generation server 250, containing some or all of the hardware/software components as the computing device 101 depicted in FIG. 1. The multi-dimensional risk score generation server 250 may include hardware, software, and network components to receive data from one or more data sources, such as the vehicle data source 210 (e.g., via vehicle computer 211), mobile computing device 214, real time data source 220, historical data source 230, and other data sources. The multi-dimensional risk score generation server 250 may include a database 252, which may include additional data for the multi-dimensional risk score generation server 250 to process to, for example, generate one or more multi-dimensional risk scores. The multi-dimensional risk score generation computer 251 may analyze data received from the various data sources. The multi-dimensional risk score generation server 250 may initiate communication with and/or retrieve data from the vehicle data source 210, mobile computing device 214, real time data source 220, historical data source 230 wirelessly, or by way of separate computing systems over one or more computer networks (e.g., the Internet).

A system for determining a multi-dimensional risk score is described herein. The model may generate one or more risk scores based on various factors indicating a nature of an event. The risk associated with the event may then be determined. The risk score may be displayed on a risk map, such as the live risk map described in U.S. Provisional Patent Application Ser. No. 62/274,888 filed Jan. 5, 2016 and entitled "Live Risk Map" and/or the live risk map described in U.S. patent application Ser. No. 15/182,920 entitled "Data Processing System Communicating With A Map Data Processing System To Generate A Display Of One Or More Segments Of One Or More Vehicle Routes" and filed Jun. 15, 2016. Each of the aforementioned applications is hereby incorporated by reference in its entirety.

Categories of factors and a catalog of post-event impacts used in risk map concepts may be visualized along several different dimensions (e.g., 5 different dimensions), as will be described in further detail below. The mathematical concept of tensor (e.g., as in explaining general relativity) may be used with for multi-dimensional frameworks. For example, scalars, vectors, matrices, and the like may be used in multi-dimensional frameworks.

Multi-dimensional risk scores and profiles may comprise a framework that identifies risk-related information and identifies a method to represent and visualize in-depth data related to geo-spatial, environmental, and/or driver behavior. This framework may allow both humans viewing the data (who may be driving and/or monitoring real time and/or predictive risk profiles from a remote location) and/or systems to understand and act on how, when, and why adverse events occur on roads or other locations. Some examples of such systems are autonomous vehicle platforms, connected automotive systems, traffic aggregation applications, road sensors, infrastructure monitoring systems, etc.

The systems described herein may structure information so that the system (or another computing system) may use the information (e.g., make predictions using the information) to model the users' behaviors. In some aspects, the information may be published in a format (e.g., as a specification or a standard) that any system can use to determine or compute risk. For example, the system described herein may operate a service that provides risk scores for other application developers to consume (e.g., via an application programming interface (API)). The systems described herein may be automated.

The multi-dimensional risk scoring specification and system may identify and quantify one or more variables. For example, the system may determine which risk factors on road segments can impact a vehicle or driver, as will be described in further detail below. The system may determine (e.g., quantify and/or create) a probability of an adverse event occurring. The probability may be range bound. The system may determine the potential cost (e.g., in dollars) of an adverse event, such as an accident. The system may determine potential human impact of an adverse event. The system may create, quantify, and/or represent one or more links between a vehicle attribute (e.g., a type, a make, an age, a condition, etc.) and the environment in which the vehicle is being operated, so that the adverse events may be predicted in a structured way. The system may also generate data for stakeholder tracking.

Risk in the multi-dimensional risk scoring model may manifest itself in many different ways, such as along a plurality of different dimensions (e.g., 2 dimensions, 5 dimensions, 20 dimensions, etc.). Various, non-limiting, examples of the different dimensions will now be described.

One dimension may comprise a risk trigger matrix. The risk trigger matrix may include data representing peer traffic, such as a traffic congestion index (e.g., on a scale of 1 to 10, and where −1 may indicate a road closure). Peer traffic data may also include a vehicle's relative speed (e.g., ambient speed) compared to other vehicles within a geographical area (e.g., a geo-box) or a road segment. The peer traffic data may also comprise data indicating a deviation from historic traffic speeds.

The risk trigger matrix may include data representing driver behavior, such as a drunk driver index, a fatigue or tiredness index, animated conversations, and other indications of driver behavior. The matrix may additionally or alternatively include data representing passenger behavior, such as whether the passenger is noisy or may otherwise be a distraction, an audio visual distraction, etc.

The risk trigger matrix may include data representing the environment, such as the weather. For example, the data may indicate whether it is snowing (or otherwise precipitating), whether there is snow on the ground, how much snow is on the ground, the temperature, or any other weather-related attributes. The risk trigger matrix may include data representing roadway features. Exemplary roadway features include curvature, gradient, whether the roadway is a highway, paved or unpaved, and the type of terrain, among other roadway features.

Another dimension may comprise an adverse event index, such as an adverse event probability index that indicates the likelihood of an adverse event (e.g., an accident). A dimension may comprise a risk cost or liability index that may be used to estimate, for example, an insurance cost. Another dimension of multi-dimensional risk scoring model may comprise a human impact matrix that may include a casualty profile and/or injury propensity data.

One dimension may comprise a vehicle impact profile matrix. The matrix may include known information about a vehicle being driven and the potential risk or impact at that particular location, time, environment and/or real time and historic driver behavior information. For example the vehicle impact profile matrix may indicate the type of vehicle (e.g., a sedan, an SUV, a pickup truck, a minivan, a tow truck, an 18 wheeler, a motor bike, trailers, an RV, among other types of vehicles). The vehicle impact profile matrix may also include data, for each type of vehicle, indicating the vehicle model, make, age, condition, safety features, etc. The matrix may also comprise information indicating the potential impact at that particular location, time, environment, driver behavior, among other variables.

The various dimensions of the multi-dimensional risk scoring system described herein may be toggled (e.g., turned on or off) when determining an overall risk score. If a dimension is turned off, the system might not consider that dimension when calculating a risk score. On the other hand, the system might factor in a dimension when calculating the risk score if the dimension is turned on. In some aspects, toggling the dimensions may also dictate how the risks are displayed to an end user. For example, if a dimension is turned off, that particular dimension might not be displayed to the end user. However, the turned-off dimension might still be used to calculate the overall risk score.

The system described herein may determine (e.g., quantify) risk in different ways. For example, the system may quantify the risk of a driver in a vehicle not being on time to his or her destination. The system may quantify the risk of an accident involving the vehicle and/or the risk to pedestrians. Moreover, the risk may be determined by the system or presented to a user before the user begins driving or while the user is driving on the road. In some aspects, the risk may be determined or presented while the user is driving and one or more other factors are met, such as if the number of cyclists or motorcycles on the road exceeds a threshold, the number of pedestrians in the area of the vehicle exceeds a threshold, and the like.

Figure 3:
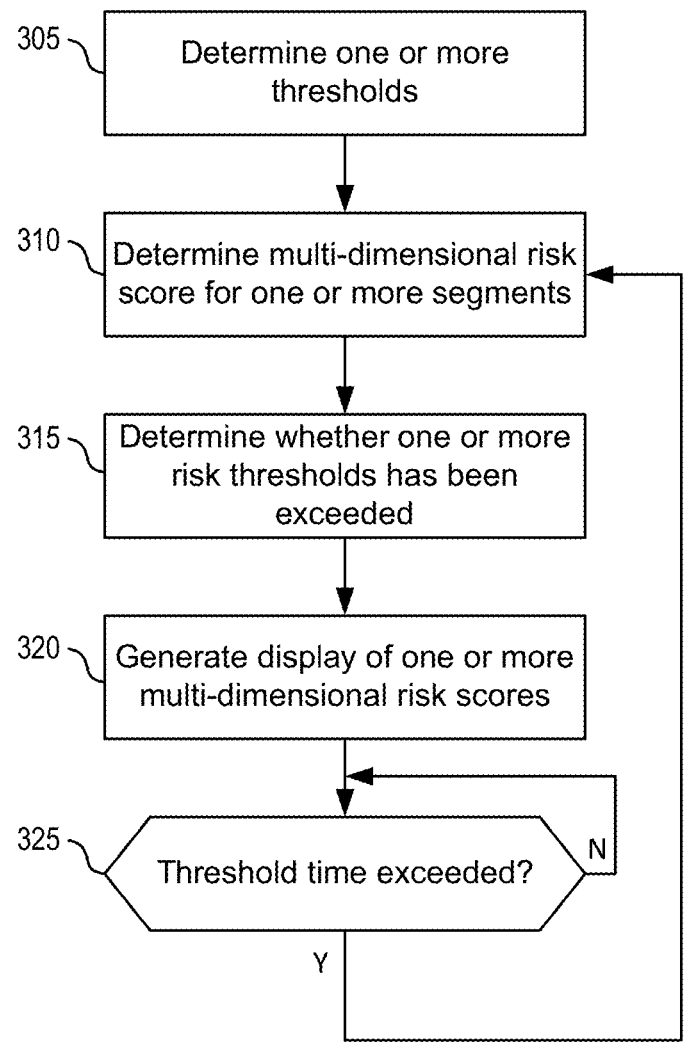
FIG. 3 is a flow diagram illustrating an example method of determining multi-dimensional risk scores according to one or more aspects of the disclosure.

FIG. 3 is a flow diagram illustrating an example method of determining multi-dimensional risk scores according to one or more aspects of the disclosure. The steps illustrated in FIG. 3 may be performed by a computing device, such as the risk score computer 251.

In step 305, the computing device may determine one or more thresholds (e.g., a threshold navigation score) used to determine how to display risk data (e.g., a risk score) for a road segment, and/or recommendations (e.g., a recommendation to deploy a fleet now or later based on current risk). The segments may be associated with a geographical location, such as the geographical location of a vehicle, a mobile computing device, or any other geographical location. For example, the road segments may be within a threshold distance of the geographical location. The road segments may additionally or alternatively form a navigation path associated with the geographical location and/or a vehicle. For example, the geographical location may comprise the origin or destination point in the navigation path. One threshold may comprise a number of roadway segments, and another threshold may comprise a risk score. As a brief example, if a risk score for two consecutive road segments (e.g., a roadway segment threshold of 1) is above seven (e.g., a risk score threshold of 6), the computing device may recommend that a fleet be deployed in the future when the risk decreases.

In step 310, the computing device may determine a multi-dimensional navigation score (e.g., a multi-dimensional risk score) for each of a plurality of different road segments. For example, there may be ten road segments in an area of interest, and risk scores for each of the 10 different road segments may be determined by the computing device. The computing device may determine a risk score for a specific segment or a collection of segments. For example, one collection of segments may be a route (e.g., a planned route or an actual route) or several alternative routes. The computing device may determine a risk score for a time in the past, a present time, or a future time, based on past, present, or future variables and conditions.

In step 315, the computing device may determine whether one or more risk thresholds has been exceeded, such as the number of roadway segments threshold and/or the risk score threshold has been exceeded. If so, the computing device may determine to display data on a risk map in a certain way to indicate that the risk is higher than usual. The computing device may also display a recommendation for the user to consider deploying a fleet, driving, etc. in the future if one or more of the thresholds has been exceeded. For example, if a risk score for two road segments, such as two consecutive road segments (e.g., a roadway segment threshold of 1), is above seven (e.g., a risk score threshold of 6), the computing device may recommend that a fleet be deployed in the future when the risk decreases. Additionally or alternatively, the computing device may recommend that the user avoids the segments with high risk scores.

Figure 4:
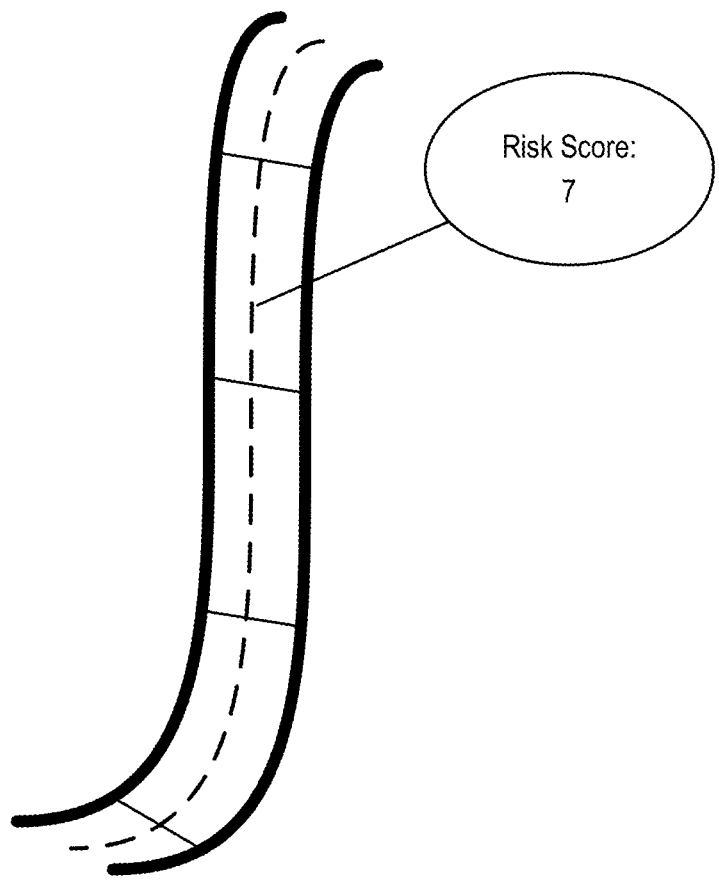
FIG. 4 illustrates an example display of road segments and multi-dimensional risk scores according to one or more aspects of the disclosure.

In step 320, the computing device may generate a display of one or more of the multi-dimensional risk scores for the road segments. The computing device may additionally or alternatively publish the data for use by other parties. The computing device may generate, as the display or data publication, a risk map, such as the risk map described in U.S. Provisional Patent Application Ser. No. 62/274,888 filed Jan. 5, 2016 and entitled "Live Risk Map" and/or the live risk map described in U.S. patent application Ser. No. 15/182,920 entitled "Data Processing System Communicating With A Map Data Processing System To Generate A Display Of One Or More Segments Of One Or More Vehicle Routes" and filed Jun. 15, 2016. Each of the aforementioned applications is hereby incorporated by reference in its entirety. FIG. 4 illustrates an example display of road segments and multi-dimensional risk scores according to one or more aspects of the disclosure.

Returning to FIG. 3, in step 325, the computing device may determine whether a threshold time has been exceeded. The threshold time may be used as the refresh rate for updating the risk score for a particular road segment. For example, the threshold time may be two minutes, and the computing device may determine (or re-determine) a multidimensional risk score for each segment. If the threshold time has been exceeded (step 325: Y), the computing device may return to step 310 to re-determine the risk score.

In some aspects, vehicle computers, mobile computing devices, or servers may leverage the data described herein, such as the multi-dimensional risk scores, in useful ways. For example, if a mobile computing device or vehicle computer recalculates the risk score, and determines that the risk of an accident or another type of risk is high on the driver's current route (e.g., the risk score exceeds a threshold), the computer may generate recommendations for alternative routes. If the vehicle is autonomous, the vehicle may automatically reroute the vehicle in those circumstances. In some aspects, multi-dimensional risk scores may be generated for assets, such as homes, offices, farm houses, farms, etc.

Figure 5A:
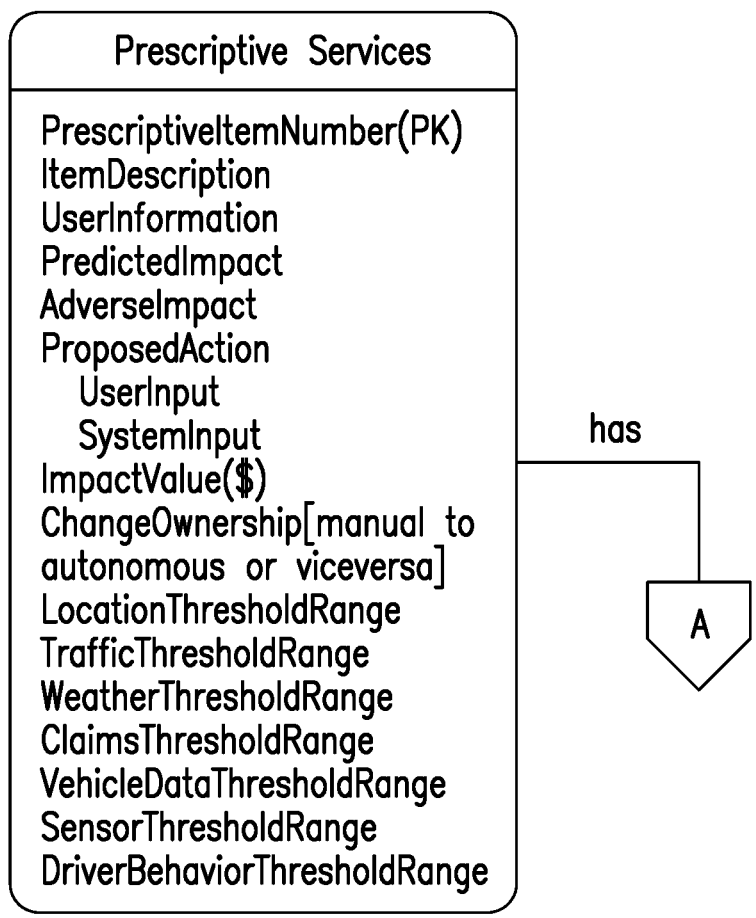
FIGS. 5A-5G illustrate multi-dimensional risk model data structures and exemplary interactions between the data structures according to one or more aspects of the disclosure.
Figure 5B:
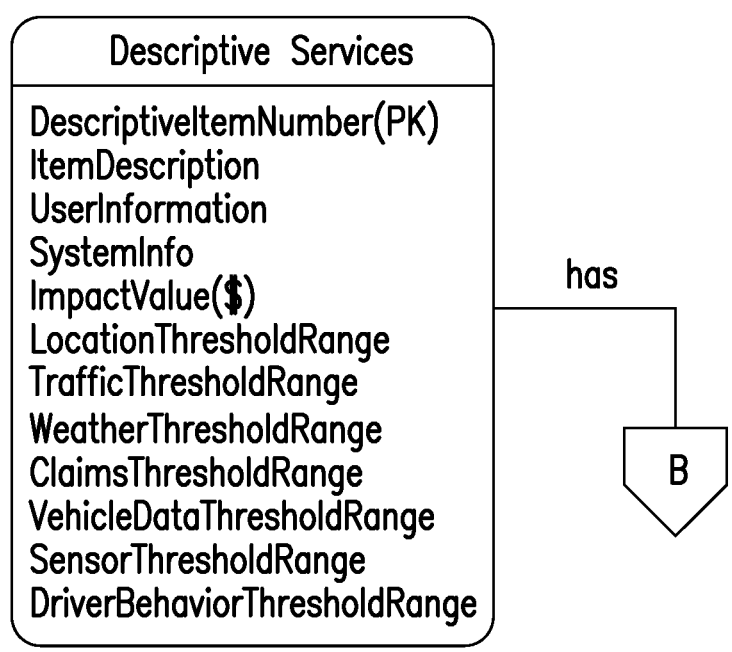
Figure 5C:
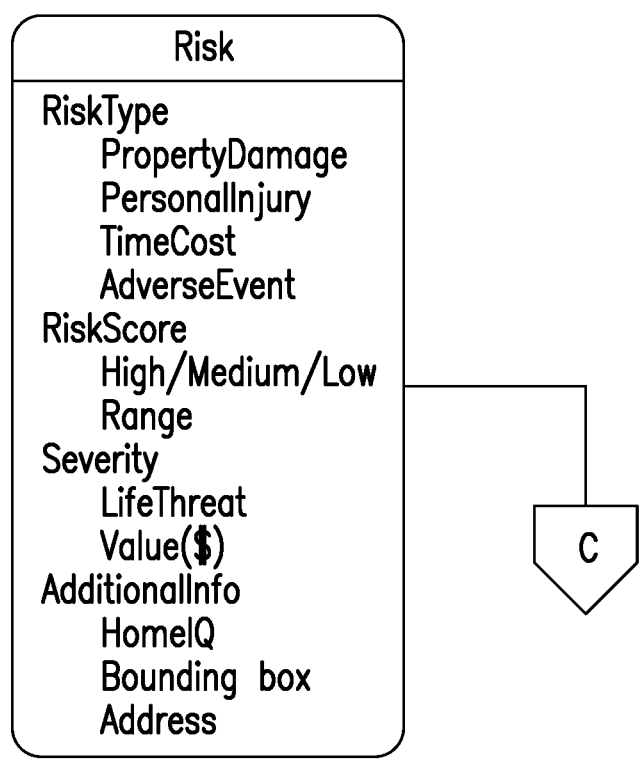

FIG. 5A illustrates a prescriptive services data structure 502. The prescriptive services data structure 502 may comprise, for example:
 a prescriptive item number
 an item description
 user information
 a predicted impact
 an adverse impact
 a proposed action, including user input and/or system input
 an impact value
 a change in ownership of the vehicle (e.g., manual to autonomous or vice versa)
 a location threshold range
 a traffic threshold range
 a weather threshold range
 a claims threshold range
 a vehicle data threshold range
 a sensor threshold range
 a driver behavior threshold range FIG. 5B illustrates a descriptive services data structure 504. The descriptive services data structure 504 may comprise, for example:
 a descriptive item number
 an item description
 user information
 system information
 an impact value (e.g., in dollars)
 a location threshold range
 a traffic threshold range
 a weather threshold range
 a claims threshold range
 a vehicle data threshold range
 a sensor threshold range
 a driver behavior threshold range FIG. 5C illustrates a risk data structure 506. The risk data structure 506 may comprise, for example:
 a risk type (e.g., property damage, personal injury, time cost, adverse event, etc.)
 a risk score (e.g., high/medium/low or a range)
 a severity (e.g., a life threat or a value, such as in dollars)
 additional information (e.g., Home IQ, a bounding box, or an address)

Figure 5D:
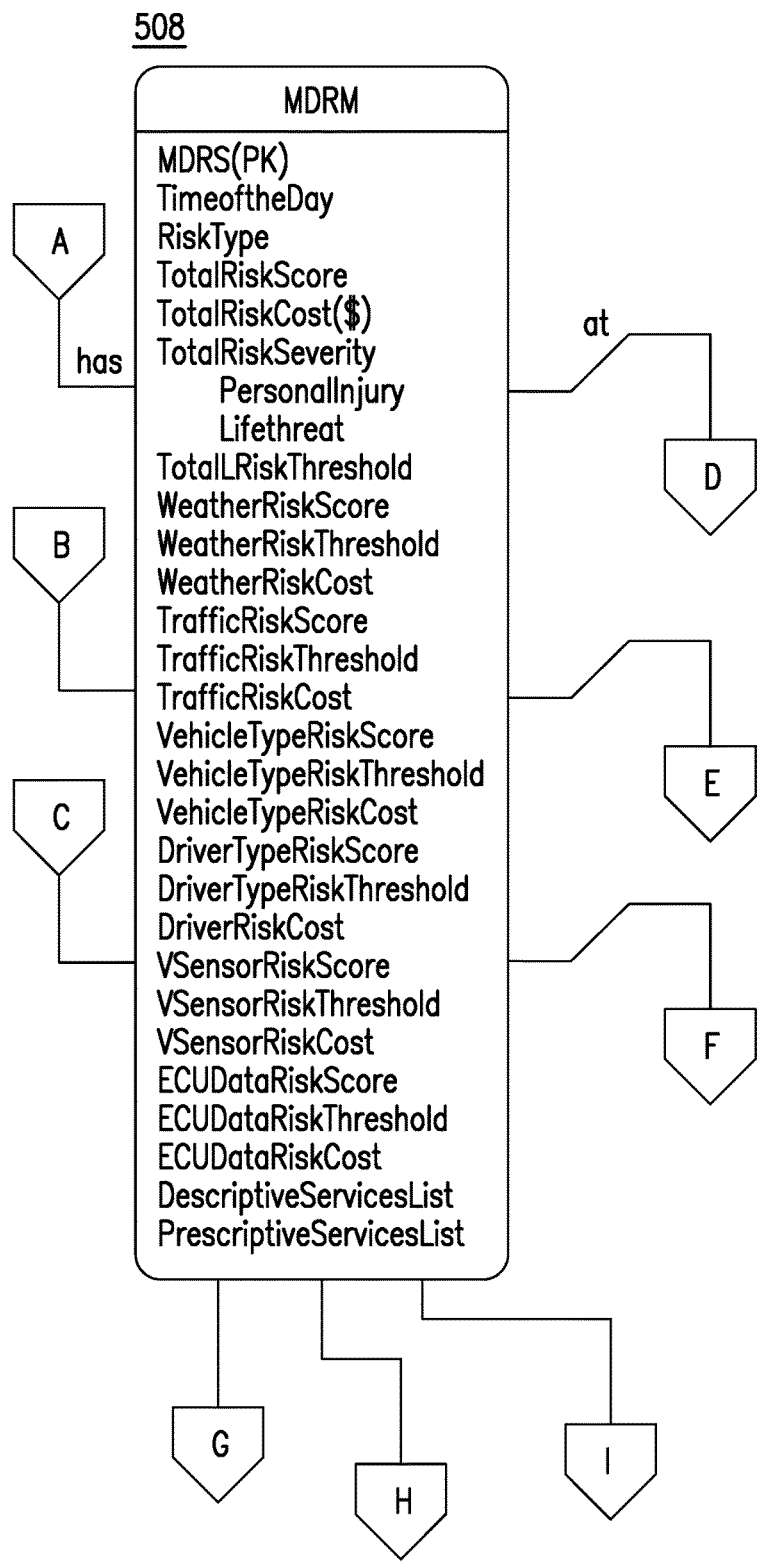

FIG. 5D illustrates a multi-dimensional risk model (MDRM) data structure 508. The MDRM data structure 508 may comprise, for example:
 a multi-dimensional risk score (MDRS)
 a time of day
 a risk type
 a total risk score
 a total risk cost (e.g., in dollars)
 a total risk severity (e.g., for personal injury and/or life threat)
 a total risk threshold
 a weather risk score
 a weather risk threshold
 a weather risk cost
 a traffic risk score
 a traffic risk threshold
 a traffic risk cost
 a vehicle type risk score
 a vehicle type risk threshold
 a vehicle type risk cost
 a driver type risk score
 a driver type risk threshold
 a driver risk cost
 a vehicle sensor risk score
 a vehicle sensor risk threshold
 a vehicle sensor risk cost
 an engine control unit (ECU) data risk score
 an ECU data risk threshold
 an ECU data risk cost
 a descriptive services list (e.g., as described above)
 a prescriptive services list (e.g., as described above)

Figure 5E:
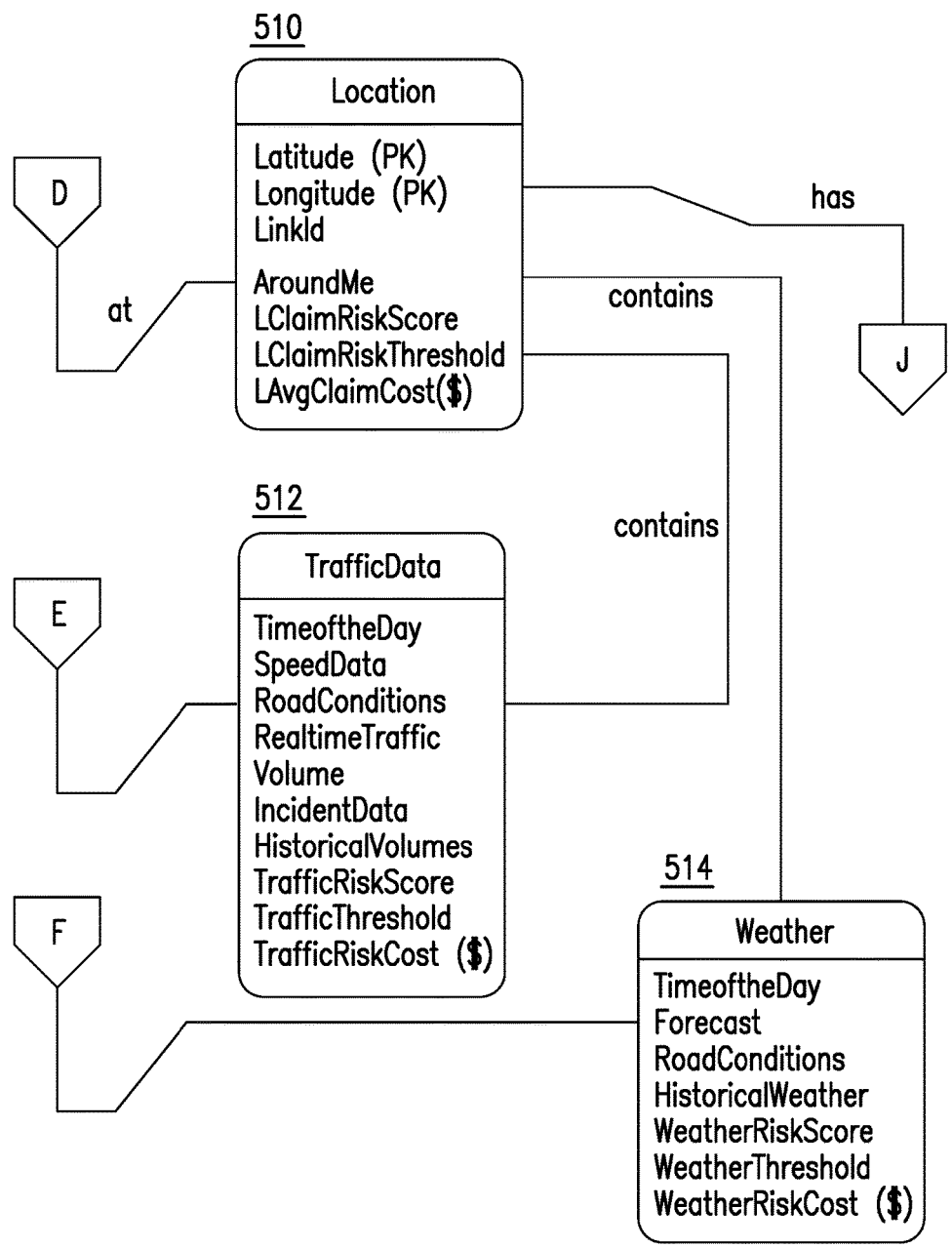

FIG. 5E illustrates a location data structure 510. The location data structure 510 may comprise, for example:
 latitude
 longitude link ID
around me data
a claim risk score (e.g., "LClaimRiskScore")
a claim risk threshold (e.g., "LClaimRiskThreshold")
an average claim cost (e.g., in dollars) (e.g., "LAvgClaimCost")

Each location may contain traffic data. FIG. 5E illustrates a location data structure 512. The location data structure 512 may comprise, for example:
time of day data
speed data
road condition data
real time traffic data
traffic volume data
incident data
historical traffic volume data
traffic risk scores
traffic thresholds
traffic risk costs (e.g., in dollars)

Each location may contain weather data. FIG. 5E illustrates a weather data structure 514. The weather data structure 514 may comprise, for example:
time of day data
weather forecast data
road condition data
historical weather data
weather risk score data
weather threshold data
weather risk cost data (e.g., in dollars)

Figure 5F:
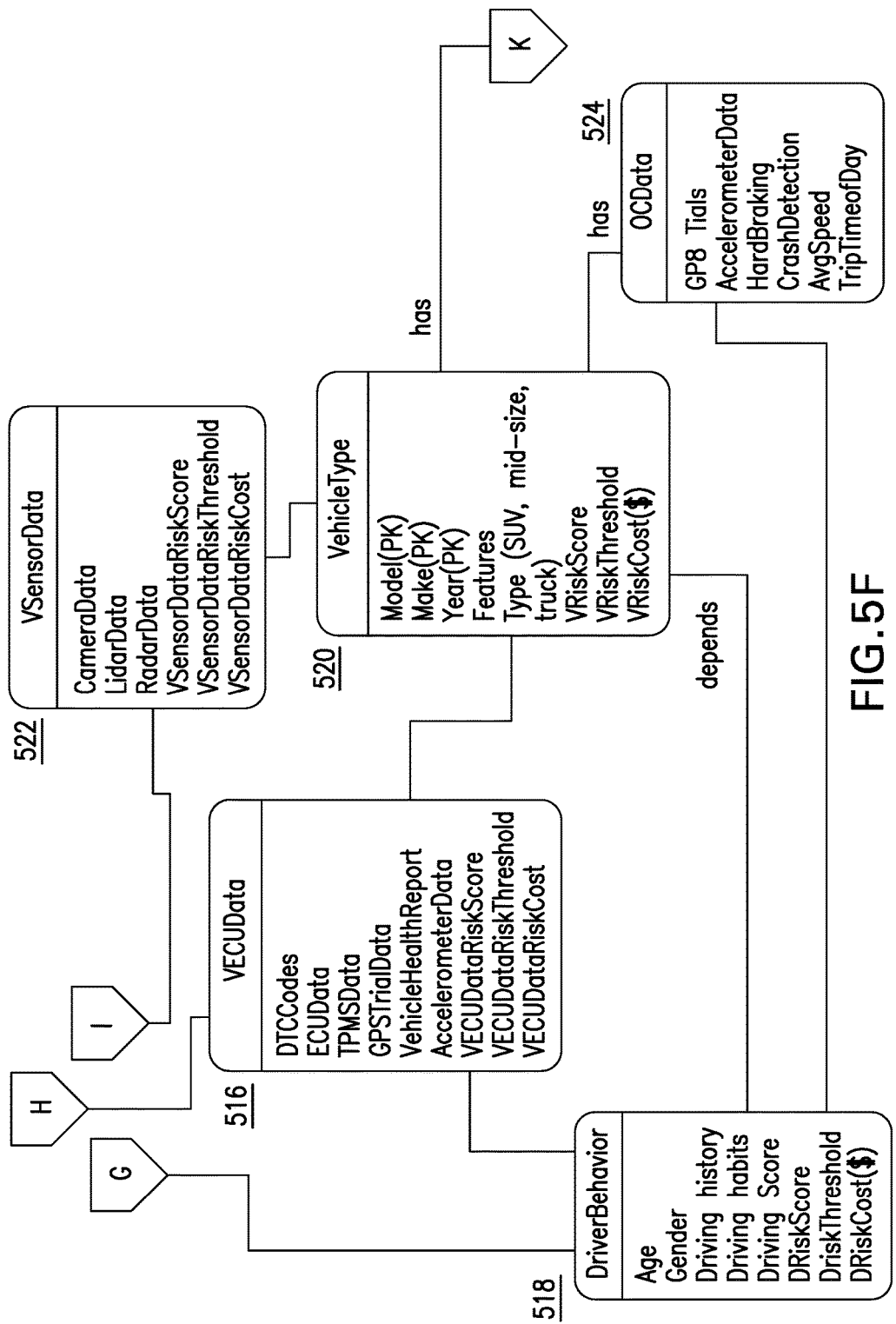

FIG. 5F illustrates a vehicle event controller data (VECU) data structure 516. VECU data structure 516 may comprise, for example:
vehicle diagnostic trouble codes (DTCs), which may indicate what is or was wrong with the vehicle
tire pressure monitoring system (TPMS) data, which may be combined with data indicating weather data such as indications of black ice
GPS trail data
vehicle health report data, which may indicate the health of the vehicle according to data from various sensors
accelerometer data
VECU data risk score
VECU data risk threshold, which may be used with the data risk score
VECU data risk cost FIG. 5F illustrates a driver behavior data structure 518. Driver behavior data structure 518 may comprise, for example:
age
gender
driving history
driving habits
driving score
driver risk score
driver risk threshold
driver risk cost (e.g., in dollars)

FIG. 5F illustrates a vehicle type data structure 520. Vehicle type data structure 520 may comprise, for example:
vehicle model
vehicle make
vehicle year
features of vehicle
type of vehicle (e.g., SUV, mid-size, truck, etc.)
vehicle risk score
vehicle risk threshold
vehicle risk cost (e.g., in dollars)

Figure 5G:
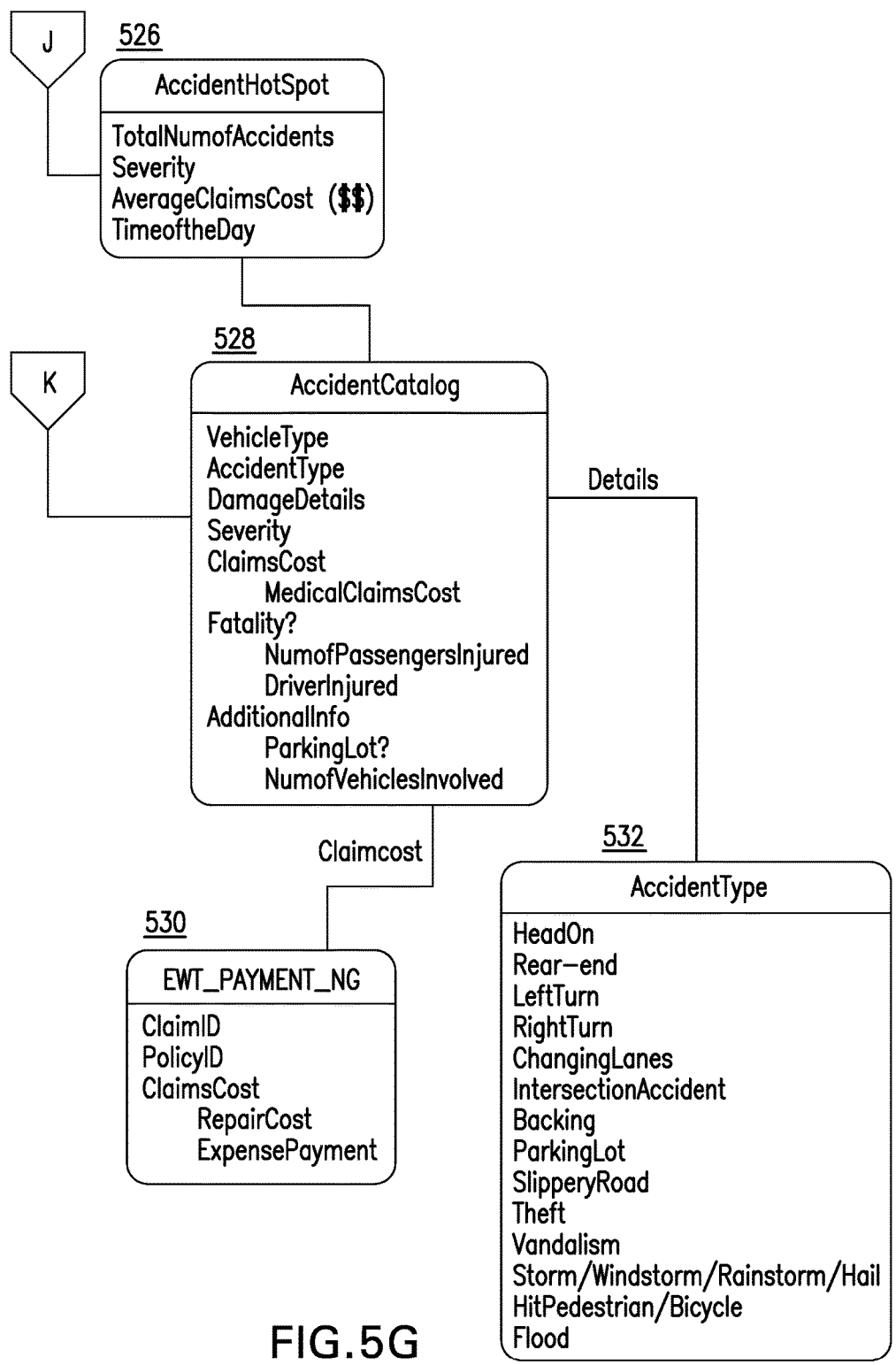

FIG. 5F illustrates a vehicle sensor data structure 522. Vehicle sensor data structure 522 may comprise, for example:
camera data
Lidar data
Radar data
vehicle sensor data risk score
vehicle sensor data risk threshold
vehicle sensor data risk cost The vehicle type data may have a data structure 524. FIG. 5F illustrates a data structure 524, which may comprise, for example:
GPS trail data
accelerometer data
hard braking event data
crash detection data
average speed data
trip time of day data Each location may have accident hot spot data. FIG. 5G illustrates an accident hot spot data structure 526, which may comprise, for example:
a total number of accidents
a severity
an average claim cost (e.g., in dollars)
a time of day FIG. 5G illustrates an accident catalog data structure 528. The accident catalog data structure 528 may comprise, for example:
vehicle type
accident type
damage details
severity
claims cost (e.g., medical claims cost)
fatality information (e.g., number of passengers injured, whether driver was injured, etc.)
additional information, such as whether the accident was in a parking lot, the number of vehicles involved in the accident, etc.

The accident catalog data may include claim cost data, such as payment data (e.g., electronic wire transfer payment data). FIG. 5G illustrates payment data structure 530, which may comprise, for example:
claim 1D
policy ID
claims cost (e.g., repair cost, expense payment, etc.)

Details of the accident may be provided by an accident type data structure. FIG. 5G illustrates an accident type data structure 532, which may comprise, for example:
whether the accident was head on
whether the accident involved a vehicle being rear ended
whether the accident involved a left turn
whether the accident involved a right turn
whether the accident involved a vehicle changing lanes
whether the accident occurred at an intersection
whether the accident involved a vehicle backing up
whether the accident occurred in a parking lot
whether the road was slippery at the time of the accident
whether the loss was caused by theft
whether the loss was caused by vandalism
whether the loss was caused by a storm, such as a windstorm, rainstorm, hail, etc.
whether a pedestrian or bicycle was hit
whether the loss or accident was caused by a flood While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A data processing system for generating a display of one or more multi-dimensional navigation scores comprising:
   a vehicle comprising a vehicle sensor configured to sense driving data and data indicating a geographical location of the vehicle;
   a data source device comprising:
      a data source computer; and
      a database storing historical data or real time data associated with a plurality of segments of road, wherein the plurality of segments of road form at least a portion of a navigation route for the vehicle;
   a map data processing device remote from the vehicle, the map data processing device comprising:
      a map data processing computer; and
      memory storing computer-executable instructions that, when executed by the map data processing computer, cause the map data processing device to:
         determine the geographical location of the vehicle based on the data indicating the geographical location of the vehicle received from the vehicle;
         determine, from the plurality of segments of road, each segment of road associated with the geographical location and receive one or more of the historical data or real time data for each segment of road from the data source device or the driving data from the vehicle;
         determine a threshold navigation score and a threshold segment number;
         determine, using the one or more of the historical data, real time data or driving data, a respective multi-dimensional navigation score for each segment of road;
         determine whether the respective multi-dimensional navigation score for each segment of road exceeds the threshold navigation score, and determine whether a number of segments of road, of which the respective multi-dimensional navigation score exceeds the threshold navigation score, exceeds the threshold segment number; and
         based on the determination that the number of segments of road, of which the respective multi-dimensional navigation score exceeds the threshold navigation score, exceeds the threshold segment number, generate a display of a recommendation to deploy a fleet or to drive at a time in the future.

2. The data processing system of claim 1, wherein the memory stores computer-executable instructions that, when executed by the map data processing computer, cause the map data processing device to:
   in response to determining that a first multi-dimensional navigation score for a first segment of road exceeds the threshold navigation score, generate a display of the first multi-dimensional navigation score for the first segment.

3. The data processing system of claim 2, wherein determining the geographical location of the vehicle comprises:
   determining the geographical location of the vehicle by one or more of a global positioning system device or a cellular device.

4. The data processing system of claim 2, wherein the memory stores computer-executable instructions that, when executed by the map data processing computer, cause the map data processing device to:
   in response to determining that a second multi-dimensional navigation score for a second segment of road does not exceed the threshold navigation score, prevent a display of the second multi-dimensional navigation score.

5. The data processing system of claim 2, wherein the memory stores computer-executable instructions that, when executed by the map data processing computer, cause the map data processing device to:
   in response to a determination that a threshold time has been exceeded, re-determine the first multi-dimensional navigation score for the first segment of road; and
   generate a display of the re-determined first multi-dimensional navigation score.

6. The data processing system of claim 1, wherein the determining the multi-dimensional navigation score for each segment of road comprises:
   determining the multi-dimensional navigation score based on two or more of data indicating peer traffic, data indicating driver behavior, data indicating passenger behavior, weather data, data indicating roadway features, adverse event probability data, risk cost index data, or data describing the vehicle.

7. A method comprising:
   determining a geographical location of a vehicle based on data indicating the geographical location of the vehicle received from the vehicle and sensed by a vehicle sensor of the vehicle;
   determining, by a map data processing computer remote from the vehicle and from a plurality of segments of road, a segment of road associated with the geographical location, and receiving one or more of historical data or real time data for the segment of road associated with the geographical location from a data source device storing the historical data or real time data associated with the plurality of segments of road or driving data sensed by the vehicle sensor from the vehicle, wherein the plurality of segments of road form at least a portion of a navigation route for the vehicle;
   determining, by the map data processing computer remote from the vehicle, a threshold navigation score and a threshold segment number;
   determining, using the one or more of the driving data, the historical data, or the real time data, a respective multi-dimensional navigation score for each segment of road;
   determining whether the respective multi-dimensional navigation score for each segment of road exceeds the threshold navigation score, and determining whether a number of segments of road, of which the respective multi-dimensional navigation score exceeds the threshold navigation score, exceeds the threshold segment number; and
   based on a determination that the number of segments of road, of which the respective multi-dimensional navigation score exceeds the threshold navigation score, exceeds the threshold segment number, generating a display of a recommendation to deploy a fleet or to drive at a time in the future.

8. The method of claim 7, further comprising:
   in response to a determination that a first multi-dimensional navigation score for a first segment of road exceeds the threshold navigation score, generating a display of the first multi-dimensional navigation score for the first segment.

9. The method of claim 8, wherein the determining the geographical location of the vehicle comprises:
determining the geographical location of the vehicle by one or more of a global positioning system device or a cellular device.

10. The method of claim 8, further comprising:
determining that a second multi-dimensional navigation score for a second segment of road associated with the geographical location exceeds the threshold navigation score; and
in response to a determination that the second multi-dimensional navigation score for the second segment of road does not exceed the threshold navigation score, preventing a display of the second multi-dimensional navigation score.

11. The method of claim 8, further comprising:
in response to a determination that a threshold time has been exceeded, re-determining the first multi-dimensional navigation score for the first segment of road; and
generating a display of the re-determined first multi-dimensional navigation score.

12. The method of claim 7, wherein determining the multi-dimensional navigation score for each segment of road comprises determining the multi-dimensional navigation score based on two or more of data indicating peer traffic, data indicating driver behavior, data indicating passenger behavior, weather data, data indicating roadway features, adverse event probability data, risk cost index data, or data describing the vehicle.

13. A map data processing device comprising:
a map data processing computer; and
memory storing computer-executable instructions that, when executed by the map data processing computer, cause the map data processing device to:
determine a geographical location of a vehicle based on data indicating the geographical location of the vehicle received from the vehicle, the data indicating the geographical location of the vehicle being sensed by a vehicle sensor of the vehicle, the vehicle being remote from the map data processing device;
determine, from a plurality of segments of road, a segment of road associated with the geographical location and receive one or more of historical data or real time data for the segment of road from a data source device storing the historical data or real time data associated with the plurality of segments of road or driving data sensed by the vehicle sensor from the vehicle, wherein the plurality of segments of road form at least a portion of a navigation route for the vehicle;
determine a threshold navigation score and a threshold segment number;
determine, using the one or more of the driving data, the historical data, or the real time data, a respective multi-dimensional navigation score for each segment of road;
determine whether the respective multi-dimensional navigation score for each segment of road exceeds the threshold navigation score, and determine whether a number of segments of road, of which the respective multi-dimensional navigation score exceeds the threshold navigation score, exceeds the threshold segment number; and
based on a determination that the number of segments of road, of which the respective multi-dimensional navigation score exceeds the threshold navigation score, exceeds the threshold segment number, generate a display of a recommendation to deploy a fleet or to drive at a time in the future.

14. The map data processing device of claim 13, wherein the memory stores computer-executable instructions that, when executed by the map data processing computer, cause the map data processing device to:
in response to a determination that a first multi-dimensional navigation score for a first segment of road exceeds the threshold navigation score, generating a display of the first multi-dimensional navigation score.

15. The map data processing device of claim 13, wherein the vehicle sensor comprises one or more of a global positioning system device or a cellular device.

16. The map data processing device of claim 14, wherein the memory stores computer-executable instructions that, when executed by the map data processing computer, cause the map data processing device to:
determine that a second multi-dimensional navigation score for a second segment of road associated with the geographical location exceeds the threshold navigation score; and
in response to a determination that the second multi-dimensional navigation score for the segment of road does not exceed the threshold navigation score, prevent a display of the second multi-dimensional navigation score.

17. The map data processing device of claim 14, wherein the memory stores computer-executable instructions that, when executed by the map data processing computer, cause the map data processing device to:
in response to a determination that a threshold time has been exceeded, re-determine the first multi-dimensional navigation score for the first segment of road; and
generate a display of the re-determined first multi-dimensional navigation score.

* * * * *